US007986372B2

(12) United States Patent
Ma et al.

(10) Patent No.: US 7,986,372 B2
(45) Date of Patent: Jul. 26, 2011

(54) SYSTEMS AND METHODS FOR SMART MEDIA CONTENT THUMBNAIL EXTRACTION

(75) Inventors: Yu-Fei Ma, Beijing (CN); Bin Lin, Beijing (CN); Zhike Kong, Sammamish, WA (US); Xinli Zou, Redmond, WA (US); Wei-Ying Ma, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1516 days.

(21) Appl. No.: 10/910,803

(22) Filed: Aug. 2, 2004

(65) Prior Publication Data

US 2006/0026524 A1 Feb. 2, 2006

(51) Int. Cl.
*H04N 5/14* (2006.01)
*H04N 9/64* (2006.01)

(52) U.S. Cl. ............... 348/700; 386/52; 386/55; 386/46

(58) Field of Classification Search .................. 348/700; 386/83, 55, 52, 46
See application file for complete search history.

(56) References Cited

U.S. PATENT DOCUMENTS

| | | | |
|---|---|---|---|
| 5,333,091 A | 7/1994 | Igguldenet al. | |
| 5,442,633 A | 8/1995 | Perkins et al. | |
| 5,497,430 A | 3/1996 | Sadovnik et al. | |
| 5,530,963 A | 6/1996 | Moore et al. | |
| 5,625,877 A | 4/1997 | Dunn et al. | |
| 5,642,294 A | 6/1997 | Taniguchi et al. | |
| 5,659,685 A | 8/1997 | Williams et al. | |
| 5,710,560 A | 1/1998 | Cohn | |
| 5,745,190 A | 4/1998 | Ioka | |
| 5,751,378 A | 5/1998 | Chen et al. | |
| 5,774,593 A | 6/1998 | Zick et al. | |
| 5,778,137 A | 7/1998 | Nielsen et al. | |
| 5,801,765 A | 9/1998 | Gotoh et al. | |
| 5,821,945 A | 10/1998 | Yeo et al. | |
| 5,835,163 A | 11/1998 | Liou et al. | |
| 5,884,056 A | 3/1999 | Steele | |
| 5,900,919 A | 5/1999 | Chen et al. | |
| 5,901,245 A | 5/1999 | Warnick et al. | |
| 5,911,008 A | 6/1999 | Niikura et al. | |
| 5,920,360 A | 7/1999 | Coleman, Jr. | |
| 5,952,993 A | 9/1999 | Matsuda et al. | |

(Continued)

FOREIGN PATENT DOCUMENTS

EP 0597450 5/1994

(Continued)

OTHER PUBLICATIONS

Beg, "User Feedback Based Enchancement in Web Search Quality", Elsevier Inc., 2004, pp. 20.

(Continued)

*Primary Examiner* — Anner Holder
(74) *Attorney, Agent, or Firm* — Lee & Hayes, PLLC (57) ABSTRACT

Systems and methods for smart media content thumbnail extraction are described. In one aspect program metadata is generated from recorded video content. The program metadata includes one or more key-frames from one or more corresponding shots. An objectively representative key-frame is identified from among the key-frames as a function of shot duration and frequency of appearance of key-frame content across multiple shots. The objectively representative key-frame is an image frame representative of the recorded video content. A thumbnail is created from the objectively representative key-frame.

22 Claims, 3 Drawing Sheets

U.S. PATENT DOCUMENTS

| | | | |
|---|---|---|---|
| 5,956,026 | A | 9/1999 | Ratakonda |
| 5,959,697 | A | 9/1999 | Coleman, Jr. |
| 5,966,126 | A | 10/1999 | Szabo |
| 5,983,273 | A | 11/1999 | White et al. |
| 5,990,980 | A | 11/1999 | Golin |
| 5,995,095 | A | 11/1999 | Ratakonda |
| 6,020,901 | A | 2/2000 | Lavelle et al. |
| 6,047,085 | A | 4/2000 | Sato et al. |
| 6,072,496 | A | 6/2000 | Guenter et al. |
| 6,100,941 | A | 8/2000 | Dimitrova et al. |
| 6,166,735 | A | 12/2000 | Dom et al. |
| 6,168,273 | B1 | 1/2001 | Dupraz et al. |
| 6,182,133 | B1 | 1/2001 | Horvitz |
| 6,232,974 | B1 | 5/2001 | Horvitz et al. |
| 6,236,395 | B1 | 5/2001 | Sezan et al. |
| 6,282,317 | B1 | 8/2001 | Luo et al. |
| 6,292,589 | B1 | 9/2001 | Chow et al. |
| 6,298,145 | B1 * | 10/2001 | Zhang et al. .................. 382/103 |
| 6,307,550 | B1 | 10/2001 | Chen et al. |
| 6,332,163 | B1 | 12/2001 | Bowman-Amuah |
| 6,353,824 | B1 | 3/2002 | Boguraev et al. |
| 6,389,168 | B2 | 5/2002 | Altunbasak et al. |
| 6,404,925 | B1 | 6/2002 | Foote et al. |
| 6,408,128 | B1 | 6/2002 | Abecassis |
| 6,421,675 | B1 | 7/2002 | Ryan et al. |
| 6,449,251 | B1 | 9/2002 | Awadallah et al. |
| 6,462,754 | B1 | 10/2002 | Chakraborty et al. |
| 6,466,702 | B1 | 10/2002 | Atkins et al. |
| 6,473,778 | B1 | 10/2002 | Gibbon |
| 6,516,090 | B1 | 2/2003 | Lennon et al. |
| 6,581,096 | B1 | 6/2003 | Cottrille et al. |
| 6,616,700 | B1 * | 9/2003 | Thum et al. .................. 715/273 |
| 6,622,134 | B1 | 9/2003 | Sorkin |
| 6,631,403 | B1 | 10/2003 | Deutsch et al. |
| 6,643,643 | B1 | 11/2003 | Lee et al. |
| 6,643,665 | B2 | 11/2003 | Kimbell et al. |
| 6,658,059 | B1 | 12/2003 | Iu et al. |
| 6,661,468 | B2 | 12/2003 | Alten et al. |
| 6,670,963 | B2 | 12/2003 | Osberger |
| 6,711,587 | B1 * | 3/2004 | Dufaux .................. 707/104.1 |
| 6,714,909 | B1 | 3/2004 | Gibbon et al. |
| 6,721,454 | B1 | 4/2004 | Qian et al. |
| 6,773,778 | B2 | 8/2004 | Onozawa et al. |
| 6,792,144 | B1 | 9/2004 | Yan et al. |
| 6,807,361 | B1 | 10/2004 | Girgensohn et al. |
| 6,870,956 | B2 | 3/2005 | Qi et al. |
| 6,934,415 | B2 | 8/2005 | Stentiford |
| 6,956,573 | B1 | 10/2005 | Bergen et al. |
| 7,006,091 | B2 | 2/2006 | Masera et al. |
| 7,055,166 | B1 * | 5/2006 | Logan et al. .................. 725/32 |
| 7,062,705 | B1 | 6/2006 | Kirkwood et al. |
| 7,065,707 | B2 | 6/2006 | Chen et al. |
| 7,069,310 | B1 | 6/2006 | Bartholomew |
| 7,072,984 | B1 | 7/2006 | Polonsky et al. |
| 7,095,907 | B1 | 8/2006 | Berkner et al. |
| 7,116,716 | B2 | 10/2006 | Ma et al. |
| 7,248,294 | B2 | 7/2007 | Slatter |
| 7,296,168 | B2 | 11/2007 | Edwards |
| 7,325,199 | B1 | 1/2008 | Reid |
| 7,356,464 | B2 | 4/2008 | Stella et al. |
| 7,546,544 | B1 | 6/2009 | Weber et al. |
| 7,639,882 | B2 | 12/2009 | Itakura |
| 2001/0023450 | A1 | 9/2001 | Chu |
| 2001/0047355 | A1 | 11/2001 | Anwar |
| 2002/0037159 | A1 | 3/2002 | Goto et al. |
| 2002/0067376 | A1 | 6/2002 | Martin et al. |
| 2002/0069218 | A1 | 6/2002 | Sull et al. |
| 2002/0073218 | A1 | 6/2002 | Aspromonte et al. |
| 2002/0100052 | A1 | 7/2002 | Daniels |
| 2002/0116533 | A1 | 8/2002 | Holliman et al. |
| 2002/0157116 | A1 | 10/2002 | Jasinschi |
| 2002/0166123 | A1 | 11/2002 | Schrader et al. |
| 2003/0033347 | A1 | 2/2003 | Bolle et al. |
| 2003/0115607 | A1 | 6/2003 | Morioka et al. |
| 2003/0123850 | A1 | 7/2003 | Jun et al. |
| 2003/0152363 | A1 | 8/2003 | Jeannin et al. |
| 2003/0206656 | A1 | 11/2003 | Schwartz et al. |
| 2003/0210886 | A1 | 11/2003 | Li et al. |
| 2003/0237053 | A1 | 12/2003 | Chen et al. |
| 2004/0001106 | A1 | 1/2004 | Deutscher et al. |
| 2004/0039810 | A1 | 2/2004 | Donescu et al. |
| 2004/0040041 | A1 | 2/2004 | Crawford |
| 2004/0068481 | A1 | 4/2004 | Seshadri et al. |
| 2004/0071083 | A1 | 4/2004 | Li et al. |
| 2004/0078357 | A1 | 4/2004 | LaChapelle et al. |
| 2004/0078382 | A1 | 4/2004 | Mercer et al. |
| 2004/0078383 | A1 | 4/2004 | Mercer et al. |
| 2004/0085341 | A1 | 5/2004 | Hua et al. |
| 2004/0088726 | A1 | 5/2004 | Ma et al. |
| 2004/0125877 | A1 | 7/2004 | Chang et al. |
| 2004/0128317 | A1 | 7/2004 | Sull et al. |
| 2004/0165784 | A1 | 8/2004 | Xie et al. |
| 2004/0184776 | A1 | 9/2004 | Inoue et al. |
| 2004/0236863 | A1 | 11/2004 | Shen et al. |
| 2004/0267952 | A1 | 12/2004 | He et al. |
| 2005/0084232 | A1 | 4/2005 | Herberger et al. |
| 2005/0114784 | A1 | 5/2005 | Spring et al. |
| 2005/0169312 | A1 | 8/2005 | Cakareski et al. |
| 2005/0175001 | A1 | 8/2005 | Becker Hof et al. |
| 2005/0207442 | A1 | 9/2005 | Zoest et al. |
| 2005/0257151 | A1 | 11/2005 | Wu |
| 2005/0262439 | A1 | 11/2005 | Cameron |
| 2006/0023748 | A1 | 2/2006 | Chandhok et al. |
| 2006/0026528 | A1 | 2/2006 | Paulsen et al. |
| 2006/0074754 | A1 | 4/2006 | Toyohara et al. |
| 2006/0107209 | A1 | 5/2006 | Chen et al. |
| 2006/0123053 | A1 | 6/2006 | Scannell, Jr. |
| 2006/0190435 | A1 | 8/2006 | Heidloff et al. |
| 2006/0190615 | A1 | 8/2006 | Panwar et al. |
| 2006/0200442 | A1 | 9/2006 | Parikh |
| 2006/0239644 | A1 | 10/2006 | Barbieri |
| 2007/0027754 | A1 | 2/2007 | Collins et al. |
| 2007/0060099 | A1 | 3/2007 | Ramer et al. |
| 2008/0065751 | A1 | 3/2008 | Hampson |

FOREIGN PATENT DOCUMENTS

| | | |
|---|---|---|
| EP | 1168840 | 1/2002 |
| EP | 1213915 | 6/2002 |
| EP | 1478181(A1) | 11/2004 |
| GB | 2356080 | 5/2001 |
| JP | 2001184802 A | 7/2001 |
| JP | 2002125199 A | 4/2002 |
| JP | 2002238027 | 8/2002 |
| KR | 20020009089 A | 2/2002 |
| KR | 20040042449 A | 5/2004 |
| WO | WO0028467 A1 | 5/2000 |

OTHER PUBLICATIONS

Degn, et al., "Peer Group Filtering and Perceptual Color Image Quantization", IEEE, 1999, pp. 8.

Kelly, et al., "Implicit Feedback for Inferring User Preference: A Bibliography", SIGIR FORUM, vol. 37, No. 2, 2003, pp. 18-28.

"NOMAD (No More Advertising)", http://www.fatalfx.com/nomad/, Feb. 17, 2003 4 pages.

Pirolli, "Exploring Browser Design Trade-offs Using a Dynamical Model of Optimal Information Foraging", Proc. SIGHI Conference on Human factors in Computing Systems CHI, 1998, pp. 33-40.

Smith, et al., "Scalable Multimedia Delivery for Pervasive Computing", ACM, 1999, pp. 131-140.

Sugiyama, et al., "Adaptive Web. Search Based on User s Implicit Preference", DEWS, 2004, pp. 8.

Goncalves, "Towards a Learning Model for Feature Integration in Attention Control", retrieved on Jul. 19, 2006 at <<http://ieeexplore.ieee.org/search/srchabstract.jsp?arnumber=10135538&isnumber=21824&pun>>, International Conference on Multisensor Fusion and Integration for Intelligent Systems, Aug. 20-22, 2001, pp. 311-316.

Osberger, et al., "An Automatic Image Quality Assessment Technique Incorporating Higher Level Perceptual Factors", retrieved on Jul. 19, 2006, at <<http://ieeexplore.ieee.org/search/srchabstract.jsp?arnumber727227&isnumber==15680&punu>>, International Conference on Image Processing, vol. 3, Oct. 4-7, 1998, pp. 414-418.

O'Toole, Colin et al.; "Evaluation of Automatic Shot Boundary Detection on a Large Video Test Suite" School of Computer Applications & School of Electronic Engineering, Dublin City University, Glasnevin Dublin Ireland Challenge of Image Retrieval, Newcastle, 1999, pp. 1-12.

Itti et al.; "Computational Modelling of Visual Attention" Nature Reviews/Neuroscience, vol. 2, Mar. 2001, pp. 1-11.

Itti et al.; "A Comparison of Feature Combination Strategies for Saliceny-Based Visual Attention Systesm" Proc. of SPIE Human Vision and Electronic Imaging IV (HVEI'99), San Jose CA, vol. 3644, Jan. 1999., pp. 473-482.

Itti et al.; "A Model of Saliency-based Visual Attention for Rapid Scene Analysis" IEEE Trans. on Pattern Analysis and Machine Intelligence, 1998, 5 pages.

Lee, Keansub et al.; "Perception-Based Image Transcoding for Universal Multimedia Access" School of Electrical Engineering Korea University, Seoul Korea ,2001, IEEE, pp. 475-478.

T. Lin et al.; "Video Scene Extraction by Force Competition" IEEE Intl. Conference on Multimedia and Expo (ICME 001), Waseda University, Tokyo Japan, Aug. 2001, 4 pages.

Niebur, E. et al.; "Computational Architectures for Attention" The Attentive Brain, Chapter 9, 1998, pp. 163-186.

Sahoo P.K. et al.; "Threshold Selection Using a Minimal Histogram Entropy Difference" Optical Engineering, v36 No. 7, Jul. 1997, pp. 1976-1981.

Tsotsos J. K. et al.; "Modeling Visual Attention Via Selective Tuning" Artificial Intelligence v78 1995 pp. 507-545.

Wolfe J. M. et al.; "Deploying Visual Attention: The Guided Search Model" AI and the Eye, Chapter 4, 1990, pp. 79-103.

Zadeh L. A.; "Probability Measures of Fuzzy Events" Journal of Mathematical Analysis and Applications, 23, 1968, pp. 421-427.

Chen et al.; "A Visual Attention Model for Adapting Images on Small Displays" ACM Multimedia Systems Journal, 2003.

Chen, Jinlin et al.; "Function-based Object Model Towards Website Adaptation" Proc. of the 10th Int. WWW Conf., 2001, pp. 1-21.

Christopoulos, Charilaos et al.; "The JPEG2000 Still Image Coding System: An Overview" IEEE Transactions on Consumer Electronics, vol. 46 No. 4, Nov. 2000, pp. 1103-1127.

Gamaz et al.; "Robust Scene-Change Detection in MPEG Compressed Domain" Elec & Comp. Eng., 1998, pp. 95-99.

Gu et al.; "Dissolve Detection in MPEG Compressed Video" IEEE, 1997, pp. 1692-1696.

Heng et al.; "Post Shot Boundary Detection Technique: Flashlight Scene Determination" University of Western Australia, 1999, pp. 447-450.

Lelescu et al.; "Real-time Scene Change Detection on Compressed Multimedia Bitstream Based on Statistical Sequential Analysis" IEEE, 2000, pp. 1141-1144.

Ma et al.; "A User Attention Model for Video Summarization" Proceedings of ICIP, 2002.

O'Toole; "An MPEG-1 Shot Boundary Detector Using XIL Colour Histograms" Dublin City University, 1998, pp. 1-7.

Yeo et al.; "Rapid Scene Analysis on Compressed Video" IEEE, 1995, pp. 533-544.

Yusoff et al.; "Video Shot Cut Detection Using Adaptive Thresholding" University of Surrey, 2000, pp. 1-10.

Adams, et al., "Seeded Region Growing", IEEE, vol. 16, No. 6, 1994, pp. 641-648.

Alexander, et al., "Informedia: News-on-Demand Multimedia Information Acquisition and Retrieval", 1997, pp. 1-21.

DeManthon, et al., "Video Summarization by Curve Simplification", ACM, 1998, pp. 211-218.

Gong, et al., "Creating Motion Video Summaries with Partial Audio-Visual Alignment", IEEE, 2002, pp. 285-288.

Zhang et al., "A Hierarchical Organization Scheme for Video Data" Pattern Recognition, Elsevier, Kidlington, GB, vol. 35 No. 11, Nov. 2002, pp. 2381-2387.

"Advanced Digital Video Storage and On-line Retrieval System", Advisor Project, Jun. 30, 2002, retrieved from the Internet: http://advisor.matrasi-tls.fr/DUP_workshop_sheet.pdf.

Bertini et al., "Indexing for Resue of TV News Shots" Pattern Recognition, Elsevier, Kidlington, GB, vol. 35, No. 3, Mar. 2002, pp. 581-591.

Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.

Dufaux, "Key frame selection to represent a video", Proc. 2000 Int. Con. on Image Processing, vol. 2, Sep. 2000, pp. 275-278.

Rauschenbach, et al., "Demand-driven image transmission with levels of detail and regions of interest", Computers & Graphics, 1999, pp. 857-866.

Rauschenbach, et al., "Flexible Embedded Image Communication using Levels of Detail and Regions of Interest", Proc. IMC'98, 1998, pp. 1-10.

Li, "PeerStreaming a Practical P2P Streaming System", Microsoft, Sep. 2004, 9 pgs.

Vetro, et al., "Object-Based Transcoding for Adaptable Video Content Delivery", Transactions on Circuits and Systems for Video Technology, IEEE, vol. 11, No. 3, Mar. 2001, pp. 387-401.

Bennett, et al., "Proscenium: A Framework for Spatio-Temporal Video Editing", ACM, 2003, pp. 8.

Fan, et al., "Visual Attention Based Image Browsing on Mobile Devices", pp. 4, 2003.

Foote, et al., "Creating Music Videos using Automatic Media Analysis", pp. 8, 2002.

Girgensohn, et al., "Home Video Editing Made Easy—Balancing Automation and User Control", 8 pages, 2001.

Girgensohn, et al., "A Semi-automatic Approach to Home Video Editing", ACM, 2000, pp. 9.

Graham, et al., "The Video Paper Multimedia Playback System", ACM, 2003, pp. 3.

Hua, et al., "Automatically Convering Photographic Series into Video", ACM, 2004, pp. 8.

Hua, et al., "AVE—Automated Home Video Editing", ACM, 2003, pp. 8.

Hua, et al., "Video Booklet" IEEE, 2005, pp. 4.

Yip, et al., "The Automatic Video Editor",ACM, 2003, pp. 2.

U.S. Appl. No. 10/371,125, filed Feb. 20, 2003; Inventors: Wei-Ying Ma et al., Entitled "Systems and Methods for Enhanced Image Adaptation".

U.S. Appl. No. 10/286,053, filed Nov. 1, 2002; Inventors; Yu-Fei Ma et al., Entitled "Systems and Methods for Generating a Comprehensive User Attention Model".

U.S. Appl. No. 10/286,348, filed Nov. 1, 2002; Inventors Xian-Sheng Hua et al. Entitled "Systems and Methods for Automatically Editing a Video".

U.S. Appl. No. 10/285,933, filed Nov. 1, 2002; Inventors Yu-Fei Ma et al.: Entitled "Systems and Methods for Generating a Motion Attention Mode".

http://www.fatalfx.com/nomad/ "NOMAD (No More Advertising)" Feb. 17, 2003; 4 pages.

Cherry, Steven M.; "Pesky Home Networks Trouble Cable Behemoths" IEEE Spectrum, Apr. 2002, pp. 60-61.

Hargrove, Thomas; "Logo Detection in Digital Video" Math 100, http://toonarchive.com/logo-detection/; 9 pages, Mar. 6, 2001.

Held, Gibert; "Focus on Agere System's Orinoco PC Card" International Journal of Network Management, May/Jun. 2002, pp. 187-193.

Jha, Uma S.; "Wireless Landscape-Need for Seamless Connectivity" Wireless Personal Communications 2002 pp. 275-283.

Lienhart, R. et al.; "On the Detection and Recognition of Television Commercials" University of Mannheim, 17 pages, 1996.

Lu, Lie et al.; "A Robust Audio Classification and Segmentation Method" Microsoft Research, China, 9 pages, 2001.

Ahmad, Subutai; "VISIT: A Neural Model of Covert Visual Attention" Advances in Neural Information Processing Systems, v. 4, 1991, pp. 420-427.

Baluja et al.; "Expectation-Based Selective Attention for Visual Monitoring and Control of a Robot Vehicle" Robotics and Autonomous System, v.22 No. 3-4, Dec. 1997, pp. 329-344.

Deng et al.; "Peer Group Filtering and Perceptual Color Image Quantization" Proceedings of IEEE International Symposium on Circuits and Systems, vol. 4, 1999, pp. 21-24.

Jing et al.; "An Effective Region-Based Image Retrieval Framework" From ACM Multimedia, 2002, 28 pages.

Li et al.; "Statistical Learning of Multi-View Face Detection" Proceedings of ECCV, 2002, 25 pages.

Milanese R. et al.; "Attentive Mechanisms for Dynamic and Static Scene Analysis" Optical Engineering, v34 No. 8, Aug. 1995, pp. 2428-2434.

Lu, Lie et al.; "Content Analysis for Audio Classification and Segmentation" IEEE Transactions on Speech and Audio Processing, vol. 10 No. 7, Oct. 2002, pp. 504-516.

Lu, Lie et al.; "Content-Based Audio Segmentation Using Support Vector Machines" IEEE, 2001, pp. 956-959.

Sadlier, David A.; "Automatic TV Advertisement Detection from MPEG Bitstream" Centre for Digital Video Processing/Research Institute for Network & Communication Eng., Dublin City University, 12 pages, 2002.

Sanchez, Juan Maria; "AudiCom: A Video Analysis System for Auditing Commercial Broadcasts" Computer Vision Center Departament d'Informatica Universitat Autonoma de Barcelona, 5 pages, 1999.

Zabih, Ramin; "A Feature-Based Algorithm for Detecting and Classifying Scene Breaks" Computer Science Department, Cornell University, 16 pages, 1995.

M.A. Smith et al.; "Video Skimming and Characterization Through the Combination of Image and Language Understanding Techniques" Proc. of Computer Vision and Pattern Recognition, 1997, IEEE, pp. 775-781.

Divakaran et al; "Video Summarization Using Descriptors of Motion Activity: A Motion Activity Based Approach to Key-Frame Extraction from Video Shots" Journal of Electronic Imaging, Oct. 2001, vol. 10 n 4, pp. 909-916.

Yu-Fei Ma & Hong Jiang Zhang; "A Model of Motion Attention for Video Skimming" Microsoft Research, Asia, 4 pages, 2002.

Yu-Fei Ma & Hong-Jiang Zhang; "A New Perceived Motion Based Shot Content Representation" Microsoft Research, China, 4 pages, 2001.

Wolf, "Key Frame Selection by Motion Analysis", Conf. Proceedings Acoustics, Speech, and Signal Processing, 1996 IEEE International Conference, May 1996, vol. 2, pp. 1228-1231.

Ex parte Douglas K. Brubacher and Luciano Passuello, Board Patent Appeals and Interference, Jan. 22, 2009, 14 pages.

Padmanabhan et al., "Resilient Peer to Peer Streaming", <<http://eprints.kfupm.edu.sa/62381.pdf>>, Mar. 2003, 17 pages.

Uchihashi et al., "Video Manga: Generating Semantically Meaningful Video Summaries", In Proceedings of the Seventh ACM International Conference on Multimedia, Orland Florida, Oct. 30-Nov. 5, 1999, ACM, pp. 383-392.

Jiang et al., "GnuStream: A P2P Media Streaming System Prototype", 2003 International Conference on Multimedia and Expo, vol. 2, 5 pages.

Wang, "Design and Realization of User Model of Personalized Information Retrieval", Masteral Dissertation, Dalian University of Science and Technology, Dec. 15, 2004, 18 pages.

\* cited by examiner

SYSTEMS AND METHODS FOR SMART MEDIA CONTENT THUMBNAIL EXTRACTION

RELATED APPLICATIONS

This patent application is related to the following:
U.S. patent application Ser. No. 09/882,787, titled "A Method And Apparatus For Shot Detection", filed on Jun. 14, 2001, commonly assigned hereto, and hereby incorporated by reference;
U.S. patent application Ser. No. 10/285,933, titled "Systems and Methods for Generating a Motion Attention Model", filed on Nov. 1, 2002, commonly assigned hereto, and hereby incorporated by reference;
U.S. patent application Ser. No. 10/286,053, titled "Systems and Methods for Generating a Comprehensive User Attention Model", filed on Nov. 1, 2002, commonly assigned hereto, and hereby incorporated by reference; and
U.S. patent application Ser. No. 10/676,519, titled "A Contrast-Based Image Attention Analysis Framework", filed on Sep. 30, 2003 commonly assigned hereto, and hereby incorporated by reference;

TECHNICAL FIELD

The present invention generally relates to video rendering, and more particularly, to ways to generate and present thumbnails derived from video data.

BACKGROUND

With the convergence of home entertainment technologies, there are a growing number of devices that store many different forms of content, such as music, movies, pictures, TV, videos, games, and so forth. Devices like digital video recorders (DVRs), game consoles, and entertainment-configured computers (e.g., computers running the Windows® XP Media Center operating system from Microsoft Corporation) enable users to record, manage and playback many different forms of content. Even less featured devices, such as set-top boxes, can be designed to record multiple types of content.

As such devices are configured to store more content and offer more functionality, the ability to present the various forms of recorded content in a cohesive, understandable, and user-friendly manner continues to be a challenge. This is particularly true for Graphical User Interface (GUI) based computing devices that are designed to leverage a user's experience for visualizing possible interactions and identification of objects of interest. For instance, use of small icons in a GUI to represent content of respective image files will generally significantly facilitate a user's browsing experience across multiple image files. In this scenario, a small icon may present a visual representation of the content of each image file, so the user is not required to open image files, one by one, to look for an image of interest.

In view of the above, and since a video file comprises visual media, user interaction with video files would be enhanced if a high quality thumbnail that is substantially representative of video content could be presented to a user. Unfortunately, as compared to the relative ease of identifying representative subject matter for a single image file, it is substantially problematic to identify a representative image for a video file. One reason for this is due to inherent characteristics of video data. Video data is time-series based and is typically made up of many image frames—possibly hundreds of thousands of image frames. From such a large number of image frames, it is substantially difficult to determine which particular image frame should be used as a thumbnail to represent the subject matter of the entire video data sequence. Conventional techniques for video thumbnail generation do not overcome this difficulty.

For instance, one existing video thumbnail generating technique uses the very first frame of a video data sequence as a representative thumbnail of the video's content. Unfortunately, the first frame of video data is often a black frame or may include meaningless pre-padding data. A non-representative, black, or low image quality thumbnail may frustrate users, making it difficult for a user to quickly browse through video files (including recorded media content 140). Thus, this conventional technique is unlikely to result in selection of an image frame that will be representative of the video data sequence and substantially limited. Another known technique to generate a thumbnail for video data randomly selects a frame from the video's data sequence for the thumbnail. Such random selection does not take any objective criteria into consideration with respect to the actual content of the video. As a result, the arbitrarily selected frame may present any and often unexpected content including, for example, meaningless, low quality, commercial, noisy, and/or generally unrepresentative subject matter.

Thus, conventional video thumbnail generating techniques typically do not result in a meaningful thumbnail of a video's subject matter. Accordingly, there is a need to apply more objective criteria to locating a video data sequence image frame representative of a video's content. Presentation a thumbnail generated from such an image frame will allow an end-user to more accurately determine if the subject matter of the video is of interest.

SUMMARY

Systems and methods for smart media content thumbnail extraction are described. In one aspect program metadata is generated from recorded video content. The program metadata includes one or more key-frames from one or more corresponding shots. An objectively representative key-frame is identified from among the key-frames as a function of shot duration and frequency of appearance of key-frame content across multiple shots. The objectively representative key-frame is an image frame representative of the recorded video content. A thumbnail is created from the objectively representative key-frame.

BRIEF DESCRIPTION OF THE DRAWINGS

In the Figures, the left-most digit of a component reference number identifies the particular Figure in which the component first appears.

DETAILED DESCRIPTION

Overview

The following systems and methods for smart media content thumbnail extraction use multiple objective criteria to identify and extract a high quality video data sequence image frame that is substantially representative of the video's content. This extracted image frame is then used to generate a thumbnail that is visually descriptive and substantially representative of the recorded video data sequence. A substantially most representative image frame from a video data sequence, for example, is of high image quality (e.g., specifically colorful, not a black frame, or an objectively over plain frame), good contrast (e.g., not blurred), is not part of a commercial session, and if appropriate to the subject matter of the video data, will contain dominant people faces and/or dominant objects. Generated thumbnail images are presented in a user interface to assist a viewer in browsing among the recorded video data such as TV programs and selecting a particular recorded video.

An Exemplary System

Although not required, the systems and methods for smart media content thumbnail extraction are described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

For purposes of exemplary illustration, the systems and methods for smart media content thumbnail extraction are directed to audio and/or graphics entertainment and information systems, including television-based systems, such as broadcast TV networks, interactive TV networks, cable networks, and Web-enabled TV networks. While aspects of the described systems and methods can be implemented in any number of entertainment and information systems, and within any number and types of client devices.

Figure 1:
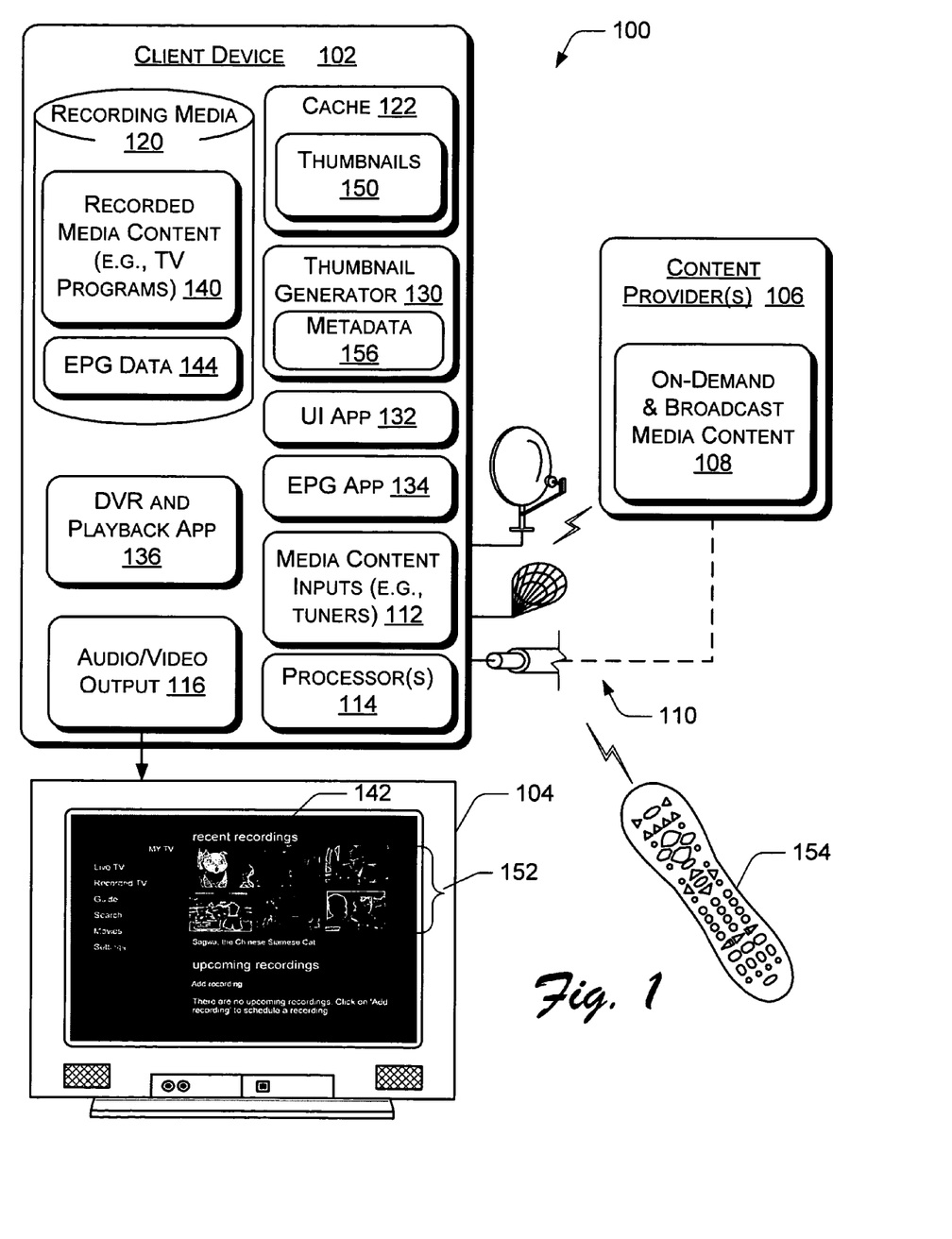
FIG. 1 shows an exemplary architecture 100 wherein systems and methods for smart media content thumbnail extraction can be partially or fully implemented.

FIG. 1 shows an exemplary architecture 100 wherein systems and methods for smart media content thumbnail extraction can be partially or fully implemented. System 100 includes a client device 102, a display 104 (e.g., television, monitor, etc.), and one or more content providers 106. The content providers 106 control distribution of on-demand and/or broadcast media content 108, such as movies, TV programs, commercials, music, and similar audio, video, and/or image content. Content providers 106 are representative of satellite operators, network television operators, cable operators, Web-based content providers, and the like.

Client device 102 receives and/or stores media content 108 distributed by the content providers 106. In particular, client device 102 is configured to receive and record TV programs broadcast or otherwise transmitted by the content providers 106. Examples of TV programs include news, sitcoms, comedies, TV movies, infomercials, talk shows, sporting events, and so on. Client device 102 can be implemented in many ways, including as a stand alone personal computing device, a TV-enabled computing device, a computer-based media server, a set top box, a satellite receiver, a TV recorder with a hard disk, a digital video recorder (DVR), a game console, an information appliance, and so forth.

In the exemplary implementation of architecture 100, client device 102 receives media content 108 via various transmission media 110, such as satellite transmission, radio frequency transmission, cable transmission, and/or via any number of other transmission media, such as a file transfer protocol over a network (e.g., Internet or Intranet) and/or data packet communication. Client device 102 includes one or more media content inputs 112, which may include tuners that can be tuned to various frequencies or channels to receive television signals and/or Internet Protocol (IP) inputs over which streams of media content are received via an IP-based network.

Client device 102 also includes one or more processors 114 which process various instructions to control operation of client device 102, to execute applications stored on client device, and to communicate with other electronic and computing devices. The processors 114 may further include a content processor to receive, process, and decode media content and program data. Client device 102 is also equipped with an audio/video output 116 that provides audio and video data to display 104, or to other devices that process and/or display, or otherwise render, the audio and video data. Video and audio signals can be communicated from client device 102 to the display 104 via an RF (radio frequency) link, S-video link, composite video link, component video link, analog audio connection, or other similar communication links.

Client device 102 is equipped with different types of memory components, including both volatile and non-volatile memory. In this example, client device 102 has a recording media 120 and a cache 122. The recording media 120 may be implemented in many ways using various non-volatile storage media, such as hard disk drives, RAID systems, recordable and/or rewritable discs, and so forth. Cache 122 can be implemented, for example, as random access memory (RAM) for faster access during data processing in client device 102. Although not shown, client device may further include one or more data memory components as well as a program memory to store applications.

One or more application programs can be stored in program memory and executed by the processor(s) 114. Representative applications shown in FIG. 1 include thumbnail generator 130, user interface (UI) application 132, electronic program guide (EPG) application 134, and DVR and playback application 136. An operating system (shown in FIG. 3) may also be maintained in storage and executed on processor(s) 114.

The DVR and playback application 136 records media content received from the content providers 106 in the recording media 120. The recorded media content 140 includes, for example, TV programs that a viewer has recorded to watch at a later time. The DVR and playback application 136 also facilitates playback of the recorded media content 140 on the display 104.

UI application 132 allows a user to browse and select recorded media content 140. In this implementation, UI application 132 supports interactive and graphical UI screens that identify media content 140 stored in the recording media 120 and offer options for handling media content 140 in some manner. For example, the UI screens might enable navigation to various recorded content (e.g., audio, still images, video, TV programs, etc.), list recently recoded content, or provide detailed information on specific content. One exemplary UI screen 142 is depicted on the display 104. This UI screen 142 shows the most recently recorded media content 140.

EPG application 134 generates a program guide for presentation on display 104. The program guide includes a schedule indicating when particular content will be broadcast for viewing and on which channel the content will be broadcast. EPG application 134 enables a viewer to navigate through the program guide and locate broadcast programs, recorded programs, video on demand programs and movies, interactive game selections, and other media access information or content of interest to the viewer. EPG data 144 is downloaded from the content providers 106 and stored in recording media 120, where it is accessed by EPG application 134 to populate the program guide.

Thumbnail generator 130 creates thumbnail images 150 representative of the recorded media content (video data) 140 and stores thumbnail images 150 into cache 122. Thumbnail images, or just "thumbnails", are derived from actual video content (recorded media content 140) and are used by UI application 132 and/or EPG application 134 to visually represent the recorded media content 140 in the UI screens. By storing thumbnails 150 in cache 122, thumbnails 150 are available for immediate retrieval to populate the appropriate UI screens. Thumbnails 150 may alternatively, or additionally, be stored in other memory, such as the recording media 120.

In FIG. 1, the UI screen 142 shows six thumbnail images 152 created from recorded media content 140 stored in the recording media 120. Thumbnails show representative video frames from related TV programs so that the viewer will visually associate a stored program with the depicted thumbnail. The viewer can then navigate the screen 142 using an input device, such as remote control handset 154, to browse among thumbnails as a way to ascertain what TV programs are recorded on the recording media 120. With the handset 154, the viewer can select a thumbnail to cause client device 102 (e.g., a computer-program application such as DVR and playback application 136) to playback the recorded media content 140 associated with the selected thumbnail 150.

In one implementation, thumbnail generator 130 is configured to create two thumbnails as the TV program is being recorded. A temporary thumbnail is derived when the TV program first begins recording. In one implementation, the temporary thumbnail is derived from a video frame extracted from a beginning portion of the TV program. For instance, thumbnail generator 130 selects the first non-black video frame in the TV program from which to derive the temporary thumbnail. In this manner, thumbnail image is generated within seconds and is available for immediate display in a UI screen as soon as the TV program begins recording.

A permanent thumbnail 150 is subsequently generated when more of the recorded media content 140 has been recorded. For purposes of discussion, the permanent thumbnail can be replaced by another thumbnail, so it is not permanent in that manner. The permanent thumbnail is generated according to smart media content thumbnail extraction techniques based on video data analysis and modeling. These techniques rely on analysis of a larger portion of the recorded media content 140, as compared to the amount of video data used to generate a temporary thumbnail 150. These smart media content thumbnail extraction operations select an image frame from recorded media content 140 that is substantially representative of the content and not dark, blurry, noisy, or comprised of commercial content. In one implementation, a permanent thumbnail is generated after a predetermined amount of content 140 has been recorded (e.g., 15 minutes, 30 minutes, etc.) or after the entire program is recorded.

Thumbnail generator 130 performs the following operations to generate a permanent thumbnail 150. First, thumbnail generator 130 builds program metadata 156 from recorded media content 140. Program metadata 156 includes recorded media content 140 (video) shot boundaries, shot key-frames, and indications of whether a shot includes commercial content. A shot is a short video clip with specific semantics, coherent camera motions, and consistent appearances. A shot boundary identifies a beginning or ending image frame boundary of a shot. Shot boundaries are used to identify the other aspects of program metadata 156 such as sub-shots, key-frames, etc. Thumbnail generator 130 analyzes program metadata 156 to identify a representative image frame as a function of shot duration, shot content repetition frequency, and content quality.

More particularly, thumbnail generator 130 decomposes recorded media content 140 into respective shots (basic semantic units) using one of multiple possible shot boundary detection techniques. Next, thumbnail generator 130 segments each shot into sub-shots as a function of camera motion. For each shot's associated sub-shots, thumbnail generator 130 sequentially selects a key-frame that is longest in duration that has a substantially low motion intensity as compared to other sub-shots. Motion intensity is defined as follows:

$$M = \frac{1}{M \times N} \sum_{i=0}^{M} \sum_{j=0}^{N} \sqrt{dx_{i,j}^2 + dy_{i,j}^2} \qquad (1)$$

where $dx_{i,j}$ and $dy_{i,j}$ are the two components of motion vector along x-axis and y-axis respectively, while M and N denote the width and height of motion vector field, respectively.

In this implementation, to ensure that a key-frame that includes commercial content is not selected as a representative image frame for a video data sequence (i.e., a candidate for a permanent thumbnail 150), thumbnail generator 130 implements one or more known commercial content detection operations to determine whether a shot includes commercial content. Based on the results of the commercial content detection, thumbnail generator 130 tags each key-frame of a shot or each shot with an indication (e.g., a flag) to indicate whether the shot includes commercial content.

Very short shots are considered to be unimportant and most likely to include commercial content. Important shots are statistically determined to present details and be of relatively long duration. A shot that includes a low image quality key-frame (e.g., black, noisy, padded frames) is not considered to be useful for substantial representation of recorded media content 140. In view of these criteria, thumbnail generator 130 filters the shots to remove from program metadata 156: (a) shots that are not long enough in duration, (b) include commercial content, and/or (c) include a key-frame that does not meet a certain threshold of image quality.

In this implementation, threshold image quality (Goodness—"G") is a function of colorfulness and contrast that is determined as follows:

$$G = \alpha \cdot C + \beta \cdot \sigma \qquad (2).$$

In equation (2), C is colorfulness measure defined by color histogram entropy, while $\sigma$ is contrast measure computed as the standard deviation of color histogram; $\alpha$ and $\beta$ are the weights for colorfulness and contrast, $\alpha + \beta = 1$ ($\alpha > 0$, $\beta > 0$). If commercial properties have been flagged, any key-frames marked as commercial are also filtered out at this step.

At this point, program metadata 156 includes objectively determined high image quality key-frames of substantial importance. Each remaining key-frame is a candidate for selection as a permanent thumbnail 150. Thumbnail generator 130 clusters the remaining key-frames in an unsupervised manner into a number of groups based on appearance similarity. In this implementation, appearance representation for clustering performance is based on a 50-dimension color correlogram. The correlogram effectively describes global distribution and local spatial correlation of colors and robustly tolerates large changes in appearance and shape. Given an image I and its histogram h with m bins, the correlogram of I is defined for color (i,j)∈[0, m−1], distance k∈[1, d] as $$\gamma_{c_i,c_j}^{(k)}(I) = \Pr_{p_1 \in I_{c_i}, p_2 \in I}\left[p_2 \in I_{c_j} \mid |p_1 - p_2| = k\right]. \quad (3)$$

Similarity measure is the other element in appearance-based clustering. In this implementation, the cosine of angle between two vectors is adopted as a similarity measurement. For example, let $\gamma_a$ and $\gamma_b$ denote two vectors or correlograms, the similarity is computed as $$Sim = \frac{\langle \gamma_a, \gamma_b \rangle}{\|\gamma_a\| \cdot \|\gamma_b\|}. \quad (4)$$

At this point, and in principle, any key-frame in a largest cluster may be used as TV/Video thumbnail due to the similar appearances. However, from the point of view of information contained by a key-frame, there may be a large variation across key-frames. A user may prefer a thumbnail 150 with one or more dominant frontal faces or main objects, because human faces or specific objects usually deliver more semantics as compared, for example, to image frames that represent plain or cluttered scenes. To take such preferences into consideration, thumbnail generator 130 search for faces in key-frames in the largest cluster using a face detection technique. If human faces are identified in any candidate key-frames, a key-frame with a largest face area is selected as a permanent thumbnail 150 for the recorded media content 140.

If no human faces are identified in the candidate key-frames, thumbnail generator 130 implements attention detection operations to search for dominant objects in key-frames. In this scenario, a key-frame with the largest object area is selected as a permanent thumbnail 150 (i.e., "thumbnail 150").

A temporary or permanent thumbnail 150 created from the TV program can be static or dynamic. A static thumbnail contains a still image generated from the video content. A dynamic thumbnail consists of multiple images generated from the video content, which are then played in a continuous loop so that thumbnail appears animated.

Temporary and permanent thumbnails 150 are stored in cache 122 in association with corresponding recorded media content 140 so that when UI application 132 and/or EPG application 134 display information about a particular TV program, the corresponding thumbnail is retrieved from cache 122 and presented in a UI screen. One way to associate thumbnails with the TV programs is via a data structure stored in memory, such as program or data memory.

An Exemplary Procedure

Figure 2:
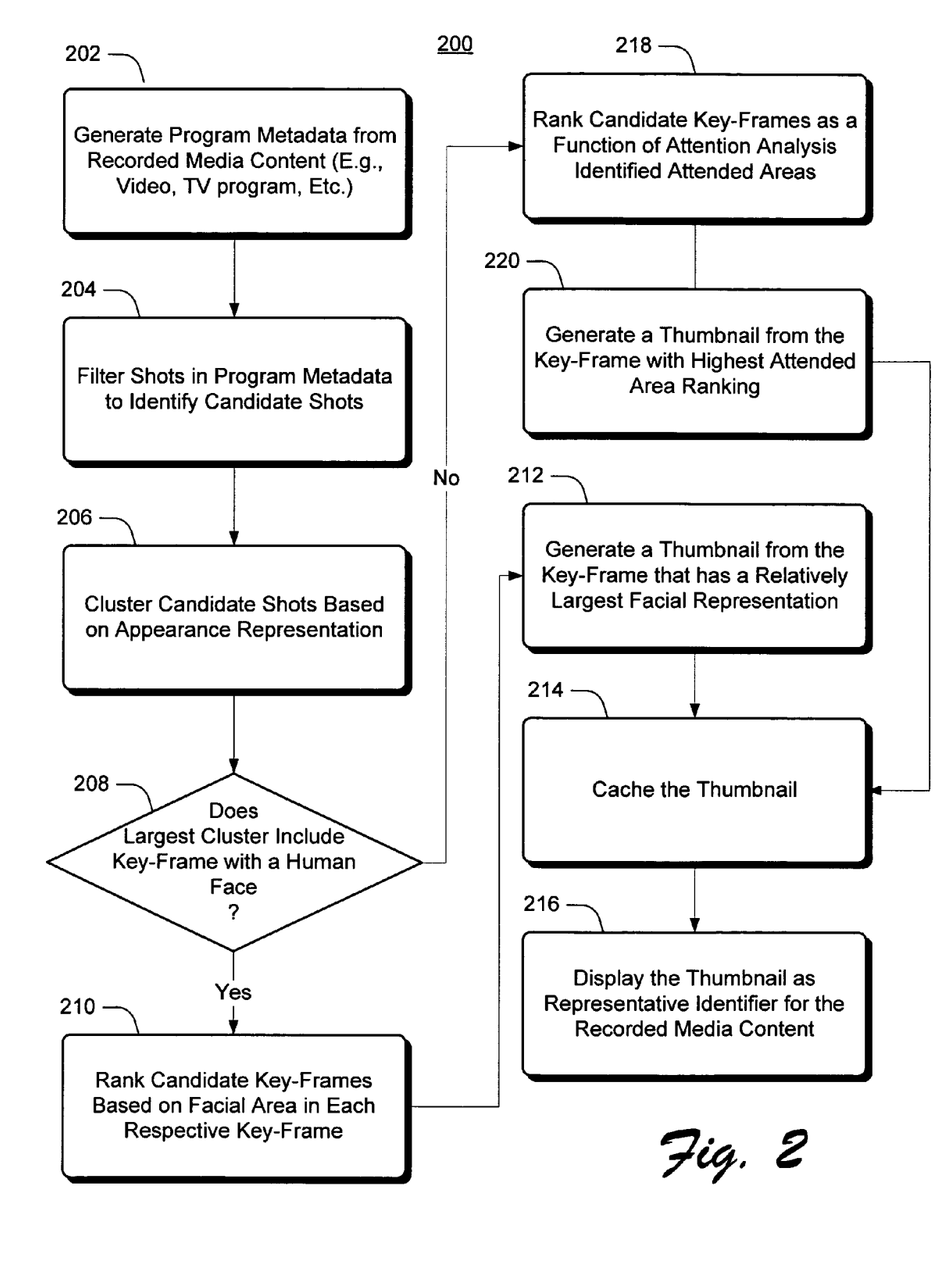
FIG. 2 illustrates an exemplary procedure for smart media content thumbnail extraction.

FIG. 2 illustrates an exemplary procedure 200 for smart media content thumbnail extraction. For purposes of discussion, operations of the procedure are discussed in relation to the features of FIG. 1. (All reference numbers begin with the number of the drawing in which the component is first introduced). At block 202, thumbnail generator module 130 generates program metadata 156 from recorded media content 140. As described above, this is accomplished by decomposing the recorded media content 140 into a set of shots. These shots are then further segmented into sub-shots according to camera motion criteria to locate a candidate key-frame for each shot. At block 204, thumbnail generator module 130 filters the shots based on a number of shot qualification criteria such as shot duration, commercial content, and/or image frame quality. At block 206, thumbnail generator module 130 clusters the remaining shots (shots that were not filtered out by operations of block 204) based on shot appearance. At block 208, thumbnail generator module 130 determines whether the largest cluster includes key-frames with a human face. If so, procedure 200 continues at block 210, wherein candidate key-frames are ranked according to facial area. At block 212, thumbnail generator module 130 generates a permanent thumbnail 150 from the key-frame determined to have the largest facial area.

At block 214, thumbnail generator module 130 caches the permanent thumbnail 150. At block 216, thumbnail generator module 130 displays the thumbnail generator module 130 as an identifier for the recorded media content 140.

At block 208, wherein thumbnail generator module 130 determines whether the largest cluster includes key-frames with a human face, if no human face is present, procedure 200 continues at block 218. At block 218, thumbnail generator module 130 ranks candidate key-frames as a function of attended areas identified by image attention analysis operations. At block 220, thumbnail generator module 130 generates a permanent thumbnail 150 from the key-frame having a most substantial attended area ranking. The operations of procedure 200 continue at block 214 as described above.

An Exemplary Operating Environment

Figure 3:
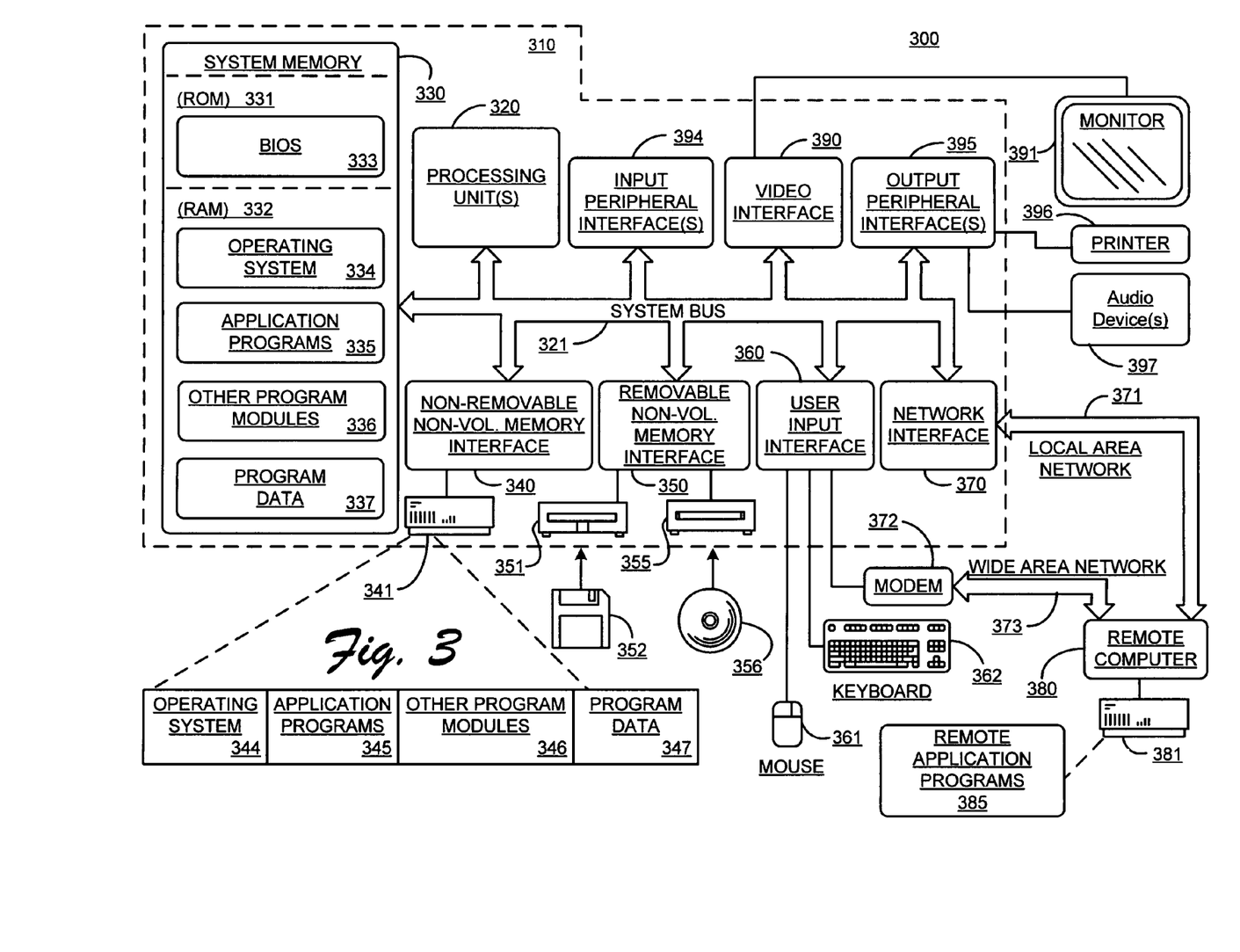
FIG. 3 illustrates an example of a suitable computing environment on which the architecture of FIG. 1 and the procedure of FIG. 2 providing smart media content thumbnail extraction may be fully or partially implemented.

FIG. 3 illustrates an example of a suitable computing environment 300 on which the architecture 100 of FIG. 1 and the procedure 200 of FIG. 2 providing smart media content thumbnail extraction may be fully or partially implemented. Accordingly, aspects of this computing environment 300 are described with reference to exemplary components and operations of FIGS. 1 and 2. The left-most digit of a component or operation (procedural block) reference number identifies the particular figure in which the component/operation first appears. Exemplary computing environment 300 is only one example of a suitable computing environment and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in class driver(s) 102 of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, system 300 includes a general purpose computing device in the form of a computer 310. Components of computer 310 may include, but are not limited to, processing unit(s) 320, a system memory 330, and a system bus 321 that couples various system components including the system memory to the processing unit 320. The system bus 321 is an exemplary implementation of internal bus 108 (FIG. 1) and may be any of several types of bus structures including a memory bus or memory controller, a peripheral bus, and a local bus using any of a variety of bus architectures. By way of example and not limitation, such architectures may include Industry Standard architecture (ISA) bus, Micro Channel architecture (MCA) bus, Enhanced ISA (EISA) bus, Video Electronics Standards association (VESA) local bus, and Peripheral Component Interconnect (PCI) bus also known as Mezzanine bus or PCI bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, and program modules. By way of example and not limitation, communication media includes wired media such as a wired network or a direct-wired connection. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331.

RAM 332 typically includes data and/or program modules that are immediately accessible to and/or presently being operated on by processing unit 320. By way of example and not limitation, FIG. 3 illustrates operating system 334, application programs 335, other program modules 336, and program data 338. In one implementation, application programs 335 includes thumbnail generator (extractor) module 130 (FIG. 1). Program data 337 includes, for example, recorded media content 140, program metadata 156, which includes for example, extracted shots, sub-shots, shot-boundary indications, key-frames, key-frame image quality measurements (e.g., goodness measurements), shot clusters, appearance representation measurements, similarity measurements, key-fram ranking values, attention values (e.g., attended areas), intermediate calculations, other data such as a shot duration threshold, etc.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 348. Note that these components can either be the same as or different from operating system 334, application programs 335, other program modules 336, and program data 338. Operating system 344, application programs 345, other program modules 346, and program data 348 are given different numbers here to illustrate that they are at least different copies.

A user may enter commands 116 and information such as user audio policy data into the computer 310 through input devices such as a keyboard 362 and pointing device 361, commonly referred to as a mouse, trackball or touch pad. Other input devices (not shown) may include a microphone (audio capture) audio device, joystick, game pad, satellite dish, scanner, or the like. These and other input devices are often connected to the processing unit 320 through a user input interface 360 that is coupled to the system bus 321, but may be connected by other interface and bus structures, such as a parallel port, game port, a universal serial bus (USB), IEEE 1394 AV/C bus, PCI bus, and/or the like.

A monitor 391 or other type of display device is also connected to the system bus 321 via an interface, such as a video interface 390. In addition to the monitor, computers may also include other peripheral output devices such as audio device(s) 397 and a printer 396, which may be connected through an output peripheral interface 395. In this implementation, respective ones of input peripheral interface(s) 394 and output peripheral interface(s) 395 encapsulate operations of audio codec(s) 110 of FIG. 1.

The computer 310 may operate in a networked environment using logical connections to one or more remote computers, such as a remote computer 380. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 381 and a wide area network (WAN) 383, but may also include other networks. Such networking environments are commonplace in offices, enterprise-wide computer networks, intranets and the Internet.

When used in a LAN networking environment, the computer 310 is connected to the LAN 381 through a network interface or adapter 380. When used in a WAN networking environment, the computer 310 typically includes a modem 382 or other means for establishing communications over the WAN 383, such as the Internet. The modem 382, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the systems and methods for smart media content thumbnail extraction (generation) have been described in language specific to structural features and/or methodological operations or actions, it is understood that the implementations defined in the appended claims are not necessarily limited to the specific features or actions described. Rather, the specific features and actions are disclosed as exemplary forms of implementing the claimed subject matter.

The invention claimed is:

1. A computer-readable medium comprising computer-program instructions executable by a processor for:
   generating program metadata from recorded video content, the program metadata comprising one or more key-frames from one or more corresponding shots;
   identifying an objectively representative key-frame from the key-frames as a function of shot duration and frequency of appearance of key-frame content across multiple shots, the objectively representative key-frame being an image frame representative of the recorded video content;
   clustering the shots based on appearance representation to generate one or more clusters; and
   if a key-frame associated with a largest cluster of clusters includes a human face, then:
   comparing the key-frame with other key-frames that include a human face; and
   selecting a key-frame with a largest facial area as the objectively representative key-frame; and
   creating a thumbnail from the objectively representative key-frame;
   wherein identifying further comprises selecting the objectively representative key-frame as a further function of low motion intensity, wherein motion intensity is defined as:

$$M = \frac{1}{M \times N} \sum_{i=0}^{M} \sum_{j=0}^{N} \sqrt{dx_{i,j}^2 + dy_{i,j}^2},$$

wherein $dx_{ij}$ and $dy_{ij}$ are components of a motion vector along an x-axis and y-axis respectively, and M and N are the width and height of a motion vector field respectively;
wherein identifying further comprises selecting the objectively representative key frame as a further function of image quality goodness, wherein image quality goodness is determined by: $G = \alpha \cdot C + \beta \cdot \sigma$, wherein C is a colorfulness measure defined by color histogram entropy, $\sigma$ is a contrast measure computed as a standard deviation of a color histogram, and $\alpha$ and $\beta$ are weights for colorfulness and contrast respectively, and
wherein generating further comprises:
   decomposing the recorded video content into multiple shots;
   deriving a set of sub-shots from each of the multiple shots; and
   for each set of sub-shots, identifying a respective key-frame of the key-frames.

2. A computer-readable medium as recited in claim 1, wherein the recorded video content is a recorded television program.

3. A computer-readable medium as recited in claim 1, wherein identifying further comprises:
   for each shot of the shots:
   (a) determining whether the shot is of short or long duration relative to other ones of the shots;
   (b) evaluating whether a key-frame of the shot is of objective high image quality;
   (c) detecting whether the shot represents commercial content;
   in view of the determining, evaluating, and detecting, removing shot(s) of short duration, objectively low image quality, or that include commercial content from the program metadata.

4. A computer-readable medium as recited in claim 1, wherein identifying further comprises:
   if a key-frame associated with a largest cluster of clusters does not include a human face, selecting a key-frame with an attended area of objectively determined high attention ranking as the objectively representative key-frame.

5. A computer-readable medium as recited in claim 1, the method further comprising presenting the thumbnail as a representative identifier of the recorded video content.

6. A method comprising:
   employing a processor that executes instructions retained in a computer-readable medium, the instructions when executed by the processor implement at least the following operations:
   generating program metadata from recorded video content, the program metadata comprising one or more key-frames from one or more corresponding shots;
   identifying an objectively representative key-frame from the key-frames as a function of shot duration and frequency of appearance of key-frame content across multiple shots, the objectively representative key-frame being an image frame representative of the recorded video content; and
   creating a thumbnail from the objectively representative key-frame,
   wherein identifying further comprises:
   clustering the shots based on appearance representation to generate one or more clusters; and
   if a key-frame associated with a largest cluster of clusters includes a human face, then:
   comparing the key-frame with other key-frames with a human face; and
   selecting a key-frame with a largest facial area as the objectively representative key-frame for each shot of the shots: (a) determining whether the shot is of short or long duration relative to other ones of the shots; (b) evaluating whether a key-frame of the shot is of objective high image quality; (c) detecting whether the shot represents commercial content; in view of the determining, evaluating, and detecting, removing shot(s)

of short duration, objectively low image quality, or that include commercial content from the program metadata.

7. A method as recited in claim 6, wherein the recorded video content is a recorded television program.

8. A method as recited in claim 6, wherein the computer-program instructions for generating further comprise instructions for comprises:
   decomposing the recorded video content into multiple shots;
   deriving a set of sub-shots from each of the multiple shots; and
   for each set of sub-shots, identifying a respective key-frame of the key-frames.

9. A method as recited in claim 6, wherein the identifying further comprises selecting the objectively representative key-frame as a further function of low motion intensity.

10. A method as recited in claim 6, wherein the identifying further comprises:
    if a key-frame associated with a largest cluster of clusters does not include a human face, selecting a key-frame with an attended area of objectively determined high attention ranking as the objectively representative key-frame.

11. A method as recited in claim 6, further comprises presenting the thumbnail as a representative identifier of the recorded video content.

12. A computing device comprising:
    a processor; and
    a memory coupled to the processor, the memory comprising computer-program instructions executable by the processor for:
    generating program metadata from recorded video content, the program metadata comprising one or more key-frames from one or more corresponding shots;
    identifying an objectively representative key-frame from the key-frames as a function of shot duration and frequency of appearance of key-frame content across multiple shots, the objectively representative key-frame being an image frame representative of the recorded video content; and
    creating a thumbnail from the objectively representative key-frame,
    wherein identifying further comprises:
      clustering the shots based on appearance representation to generate one or more clusters; and
      if a key-frame associated with a largest cluster of clusters includes a human face, then:
        comparing the key-frame with other key-frames that include a human face; and
        selecting a key-frame with a largest facial area as the objectively representative key-frame.

13. A computing device as recited in claim 12, wherein the recorded video content is a recorded television program.

14. A computing device as recited in claim 12, wherein the computer-program instructions for generating further comprise instructions for:
    decomposing the recorded video content into multiple shots;
    deriving a set of sub-shots from each of the multiple shots; and
    for each set of sub-shots, identifying a respective key-frame of the key-frames.

15. A computer-readable medium as recited in claim 6, wherein the computer-program instructions for identifying further comprise instruction for selecting the objectively representative key-frame as a further function of low motion intensity.

16. A computing device as recited in claim 12, wherein the computer-program instructions for identifying further comprise instructions for:
    for each shot of the shots:
    (a) determining whether the shot is of short or long duration relative to other ones of the shots;
    (b) evaluating whether a key-frame of the shot is of objective high image quality;
    (c) detecting whether the shot represents commercial content;
    in view of the determining, evaluating, and detecting, removing shot(s) of short duration, objectively low image quality, or that include commercial content from the program metadata.

17. A computing device as recited in claim 12, wherein the computer-program instructions for identifying further comprise instructions for:
    if a key-frame associated with a largest cluster of clusters does not include a human face, selecting a key-frame with an attended area of objectively determined high attention ranking as the objectively representative key-frame.

18. A computing device as recited in claim 12, wherein the computer-program instructions further comprise instructions for presenting the thumbnail as a representative identifier of the recorded video content.

19. A computing device comprising:
    generating means to generate program metadata from recorded video content, the program metadata comprising one or more key-frames from one or more corresponding shots; and
    identifying means to identify an objectively representative key-frame from the key-frames as a function of shot duration and frequency of appearance of key-frame content across multiple shots, the objectively representative key-frame being an image frame representative of the recorded video content,
    wherein the identifying means further comprises:
    clustering means to cluster the shots based on appearance representation to generate one or more clusters; and
    selecting means to select a key-frame with a largest facial area as the objectively representative key-frame if a key-frame associated with a largest cluster of clusters includes a human face for each shot of the shots: (a) determining whether the shot is of short or long duration relative to other ones of the shots; (b) evaluating whether a key-frame of the shot is of objective high image quality; (c) detecting whether the shot represents commercial content; in view of the determining, evaluating, and detecting, removing shot(s) of short duration, objectively low image quality, or that include commercial content from the program metadata.

20. A computing device as recited in claim 19, wherein the generating means further comprise:
    decomposing means to decompose the recorded video content into multiple shots;
    deriving means to determine a set of sub-shots from each of the multiple shots; and
    for each set of sub-shots, identifying means to identify a respective key-frame of the key-frames.

21. A computing device as recited in claim 19, wherein the identifying means further comprises:

if a key-frame associated with a largest cluster of clusters does not include a human face, selecting means to select a key-frame with an attended area of objectively determined high attention ranking as the objectively representative key-frame.

22. A computing device as recited in claim 19, further comprising presenting means to present the thumbnail as a representative identifier of the recorded video content.

* * * * *